US012732846B2

(12) United States Patent
Lee et al.

(10) Patent No.: US 12,732,846 B2
(45) Date of Patent: Sep. 8, 2026

(54) CHANNEL STATE FEEDBACK USING SENSING REFERENCE SIGNALS

(71) Applicant: QUALCOMM Incorporated, San Diego, CA (US)

(72) Inventors: Hyojin Lee, San Diego, CA (US); Yu Zhang, San Diego, CA (US); Weimin Duan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 18/188,428

(22) Filed: Mar. 22, 2023

(65) Prior Publication Data

US 2024/0323730 A1 Sep. 26, 2024

(51) Int. Cl.
*H04W 24/10* (2009.01)
*H04L 5/00* (2006.01)
*H04W 24/08* (2009.01)

(52) U.S. Cl.
CPC ........... *H04W 24/10* (2013.01); *H04L 5/0051* (2013.01); *H04W 24/08* (2013.01)

(58) Field of Classification Search
None
See application file for complete search history.

(56) References Cited

U.S. PATENT DOCUMENTS

2021/0286045 A1* 9/2021 Bayesteh ............. H04B 7/0695
2022/0052740 A1* 2/2022 Jin ....................... H04B 7/0626
2022/0070708 A1* 3/2022 Nam ..................... G01S 5/0036
2023/0065713 A1* 3/2023 Dai ......................... G01S 7/006
2023/0081552 A1* 3/2023 Chou .................. H04B 7/0639
370/329
(Continued)

FOREIGN PATENT DOCUMENTS

WO WO-2016122257 A1 * 8/2016 ........... H04B 7/0413
WO WO-2019229152 A1 * 12/2019 ........... H04B 7/0486
WO 2021203288 A1 10/2021
(Continued)

OTHER PUBLICATIONS

International Search Report and Written Opinion—PCT/US2024/014740—ISA/EPO—Jun. 5, 2024.
(Continued)

*Primary Examiner* — Jae Y Lee
(74) *Attorney, Agent, or Firm* — Weaver Austin Villeneuve & Sampson LLP

(57) ABSTRACT

Techniques for channel state feedback using sensing reference signals are disclosed. The techniques can include identifying a channel state information (CSI) report configuration based on CSI reporting configuration information received from a radio access network (RAN) node of a RAN, based on the CSI report configuration, identifying a set of basis reference signals to be measured on a wireless channel of the RAN, wherein the set of basis reference signals includes one or more sensing reference signals, measuring the set of basis reference signals to obtain channel state measurements, determining channel state information based on the channel state measurements, and transmitting a CSI report including the channel state information to the RAN node.

30 Claims, 10 Drawing Sheets

(56) References Cited

U.S. PATENT DOCUMENTS

2023/0344488 A1* 10/2023 Bhat .................... H04B 7/0626

FOREIGN PATENT DOCUMENTS

WO 2022000227 A1 1/2022
WO WO-2024181897 A1 * 9/2024 ........... G01S 7/2883

OTHER PUBLICATIONS

Wei Z., et al., "Integrated Sensing and Communication Signals Toward 5G-A and 6G: A Survey", IEEE Internet of Things Journal, vol. 10, No. 13. Jul. 1, 2023, pp. 11068-11092, Jan. 7, 2023, XP011943884, Section III.C.

* cited by examiner

CHANNEL STATE FEEDBACK USING SENSING REFERENCE SIGNALS

BACKGROUND

1. Field of Disclosure

The present disclosure relates generally to the field of wireless communications, and more specifically to the provision of channel state feedback.

2. Description of Related Art

In a joint communication and sensing (JCS) system, time, frequency, and spatial radio resources can be allocated to support both wireless communications between cooperating devices and remote radar sensing of other devices. A JCS system can be implemented in a radio access network (RAN). In a RAN that implements a JCS system, RAN nodes can transmit sensing reference signals to support radar sensing operations of devices in the RAN. Concurrently, the RAN nodes can transmit channel state information reference signals for use by devices in the RAN as a basis for performing channel state measurements and providing channel state feedback.

BRIEF SUMMARY

An example method for wireless communication by a wireless communication device in a radio access network (RAN), according to this disclosure, may include identifying a channel state information (CSI) report configuration based on CSI reporting configuration information received from a RAN node of the RAN, based on the CSI report configuration, identifying a set of basis reference signals to be measured on a wireless channel of the RAN, wherein the set of basis reference signals includes one or more sensing reference signals, measuring the set of basis reference signals to obtain channel state measurements, determining channel state information based on the channel state measurements, and transmitting a CSI report including the channel state information to the RAN node.

An example wireless communication device, according to this disclosure, may include a transceiver, a memory, and one or more processors communicatively coupled with the transceiver and the memory, wherein the one or more processors are configured to identify a CSI report configuration based on CSI reporting configuration information received from a RAN node of a RAN, based on the CSI report configuration, identify a set of basis reference signals to be measured on a wireless channel of the RAN, wherein the set of basis reference signals includes one or more sensing reference signals, measure the set of basis reference signals to obtain channel state measurements, determine channel state information based on the channel state measurements, and transmit a CSI report including the channel state information to the RAN node.

An example non-transitory computer-readable medium, according to this disclosure, may store wireless communication instructions for a wireless communication device, and the instructions may include code for identifying a CSI report configuration based on CSI reporting configuration information received from a RAN node of a RAN, based on the CSI report configuration, identifying a set of basis reference signals to be measured on a wireless channel of the RAN, wherein the set of basis reference signals includes one or more sensing reference signals, measuring the set of basis reference signals to obtain channel state measurements, determining channel state information based on the channel state measurements, and transmitting a CSI report including the channel state information to the RAN node.

An example wireless communication apparatus, according to this disclosure, may include means for identifying a CSI report configuration based on CSI reporting configuration information received from a RAN node of a RAN, means for identifying, based on the CSI report configuration, a set of basis reference signals to be measured on a wireless channel of the RAN, wherein the set of basis reference signals includes one or more sensing reference signals, means for measuring the set of basis reference signals to obtain channel state measurements, means for determining channel state information based on the channel state measurements; and means for transmitting a CSI report including the channel state information to the RAN node.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
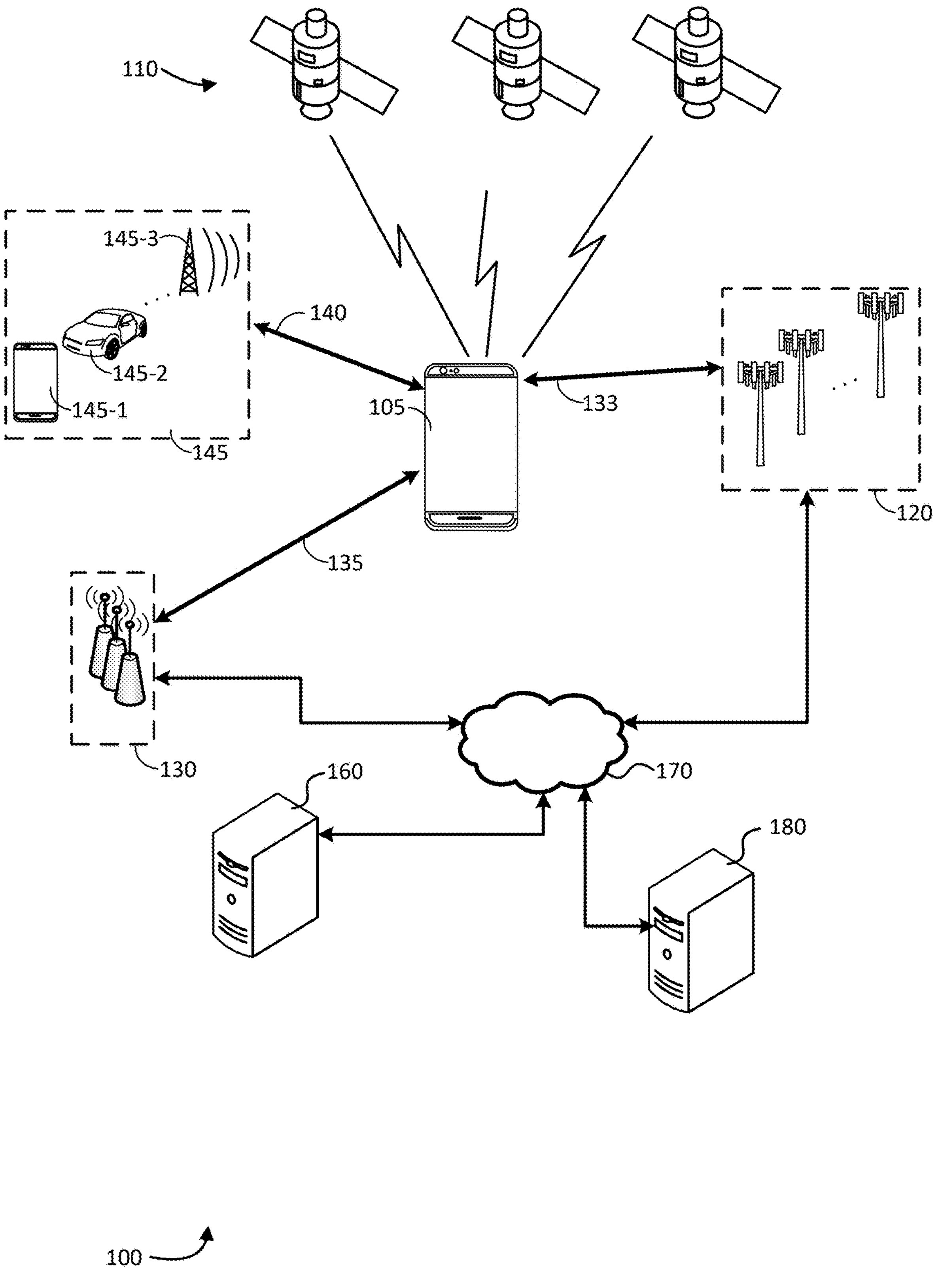
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

Various aspects relate generally to wireless communications, and more particularly to the provision of channel state feedback. Some aspects more specifically relate to the use of sensing reference signals as a basis for determining channel state information that is conveyed via channel state feedback. According to various aspects, a RAN node in a RAN cell can transmit both CSI-RSs and sensing reference signals (RSs). The RAN node can transmit the sensing reference signals during designated sensing slots, and can provide devices in the RAN cell with information usable to identify those sensing slots. In some implementations, the RAN node can have the ability to configure devices in the RAN cell to implement sensing RS-based channel state measurements. In some implementations, while one or more devices in the RAN cell are configured to implement sensing RS-based channel state measurements, the RAN node can drop CSI-RS transmission occasions that fall within sensing slots. In various implementations, based on CSI report configurations specified by the RAN node, devices in the RAN cell may derive CSI measurements based in part or whole on sensing reference signals. According to some implementations, some devices can derive CSI measurements based on both sensing reference signals and on CSI-RSs. According to some implementations, some devices can derive CSI measurements based solely on sensing reference signals. In various implementations, allowing devices to perform channel state measurements based on sensing reference signals can support improvements in spectral efficiency in conjunction with joint communication and sensing (JCS).

FIG. 1 is a simplified illustration of a positioning system 100 in which a UE 105, location server 160, and/or other components of the positioning system 100 can use the techniques provided herein for channel state feedback using sensing reference signals, according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network

170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
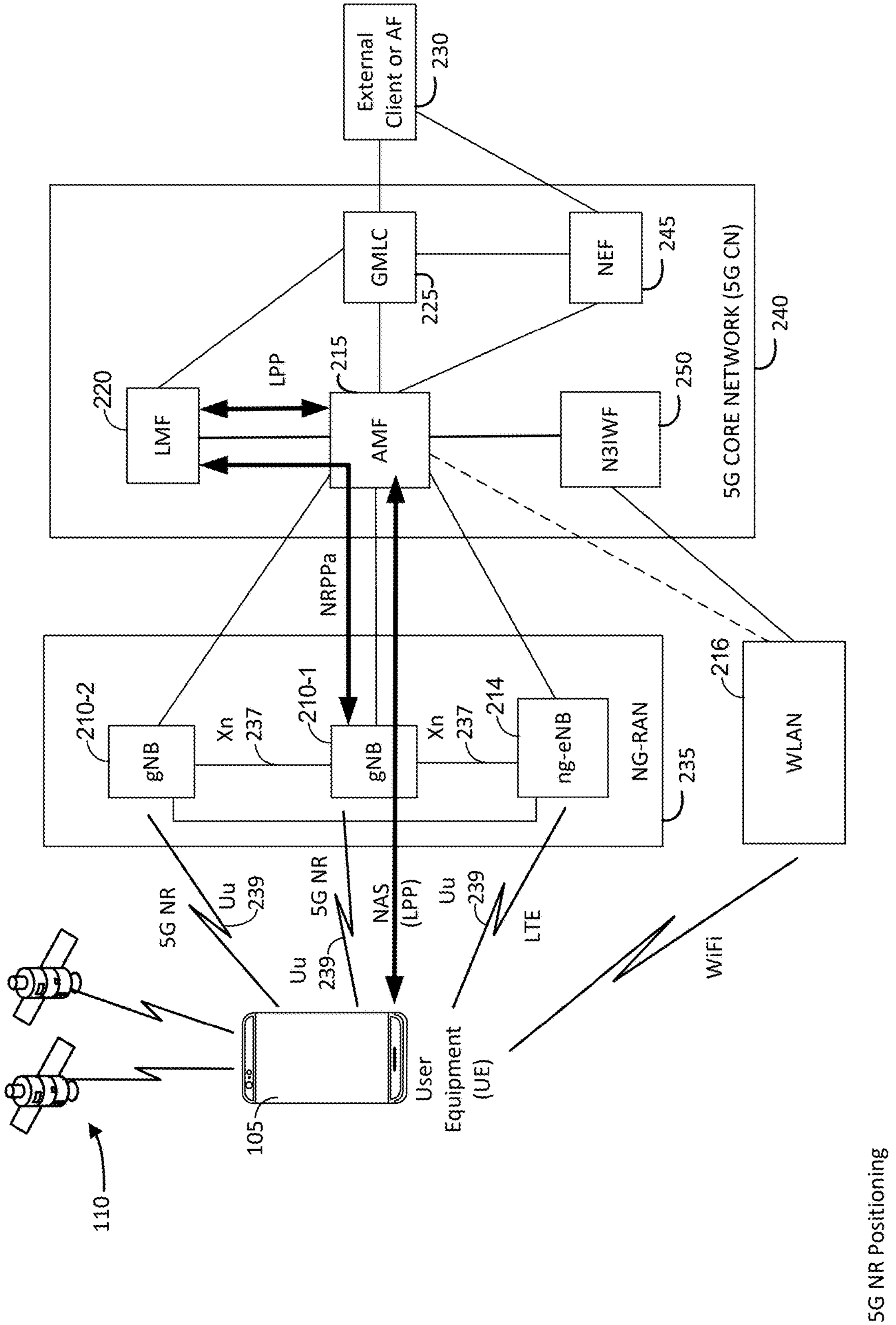
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
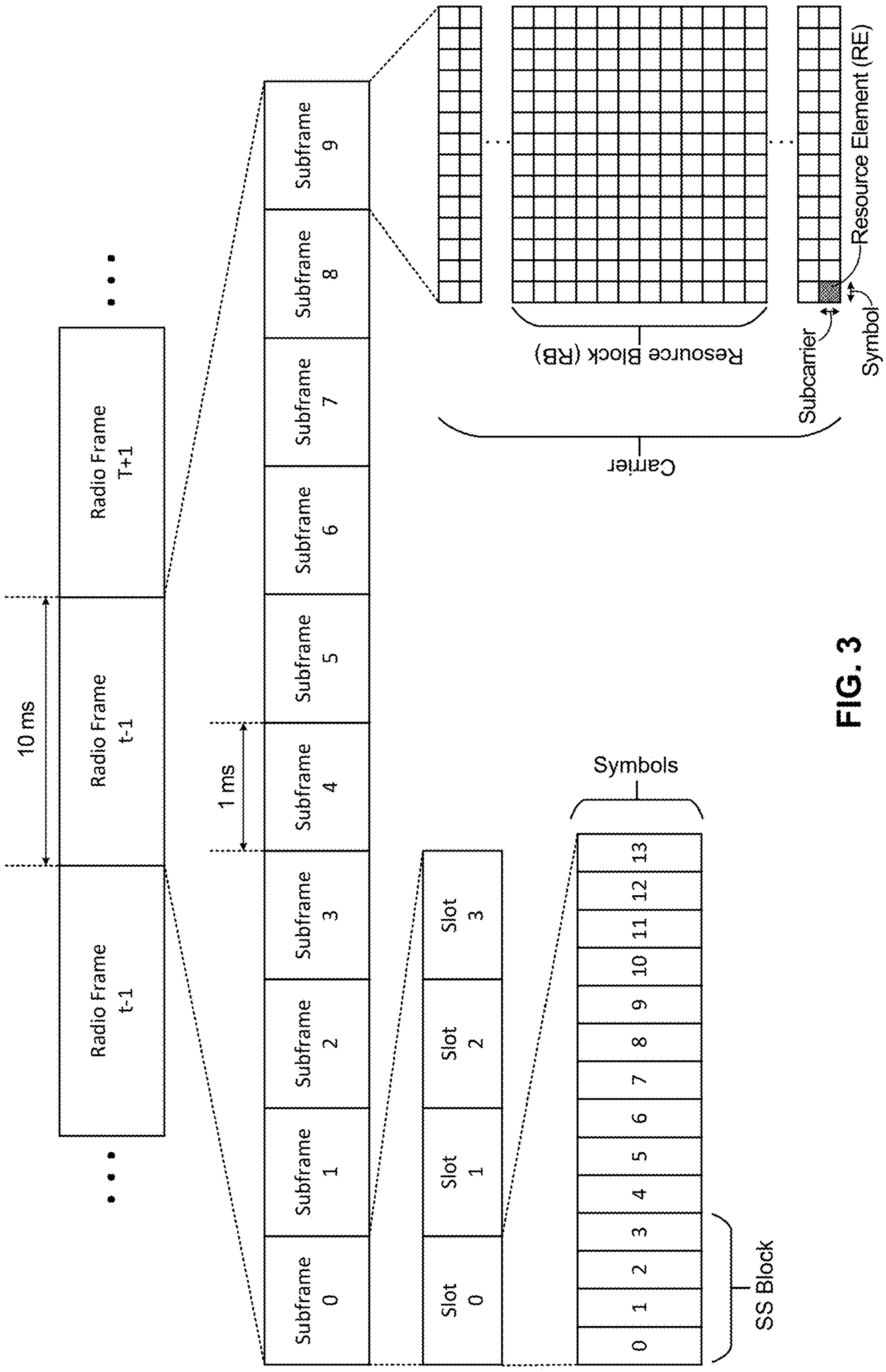
FIG. 3 is a diagram showing an example of a frame structure for NR and associated terminology.

FIG. 3 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
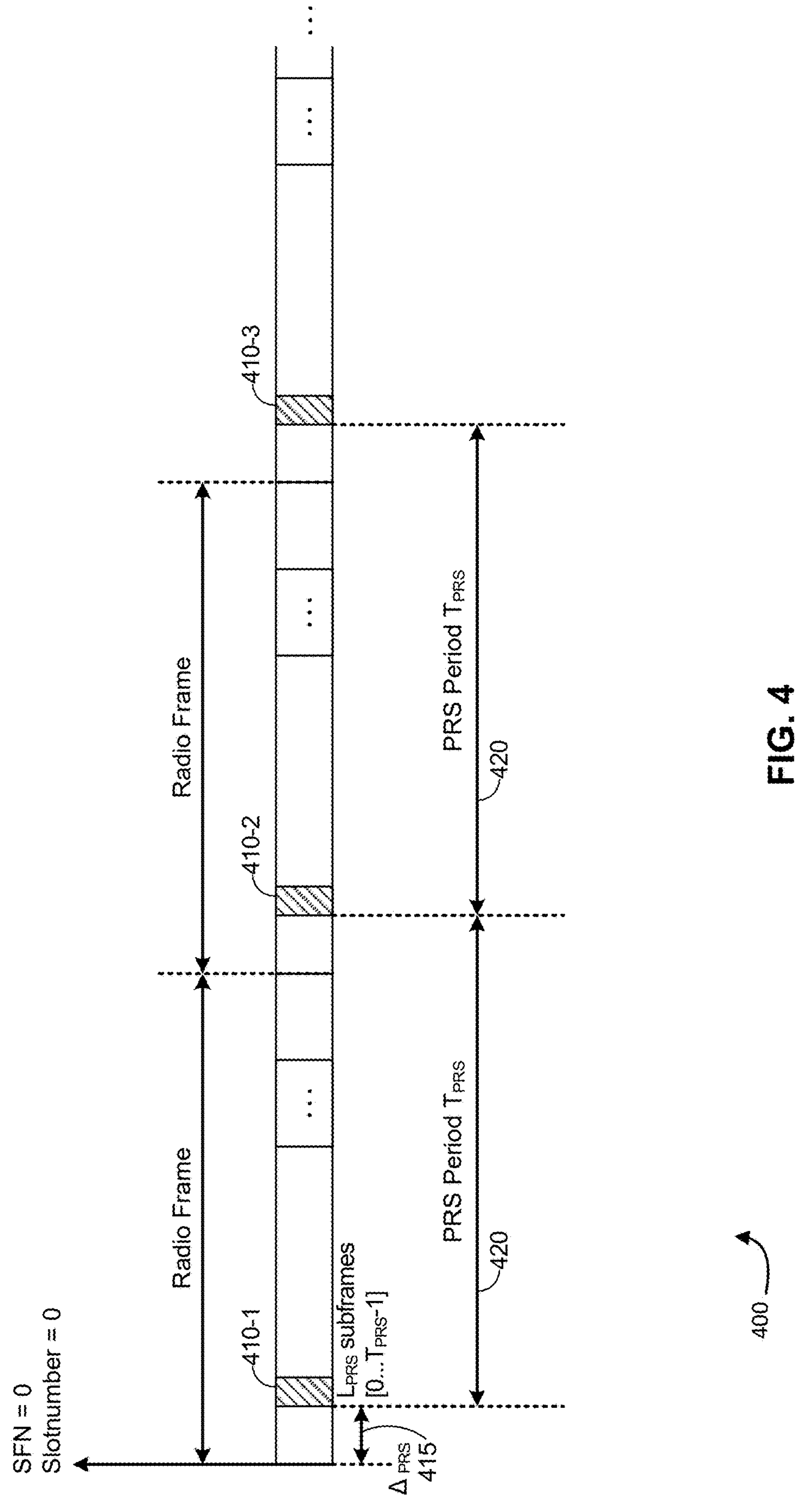
FIG. 4 is a diagram showing an example of a radio frame sequence with Positioning Reference Signal (PRS) positioning occasions.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of $L_{PRS}$ subframes, and the PRS Periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 415 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number $N_{PRS}$ of consecutive positioning subframes where the number $N_{PRS}$ may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 420 and cell-specific subframe offset ($\Delta_{PRS}$) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

Figure 6:
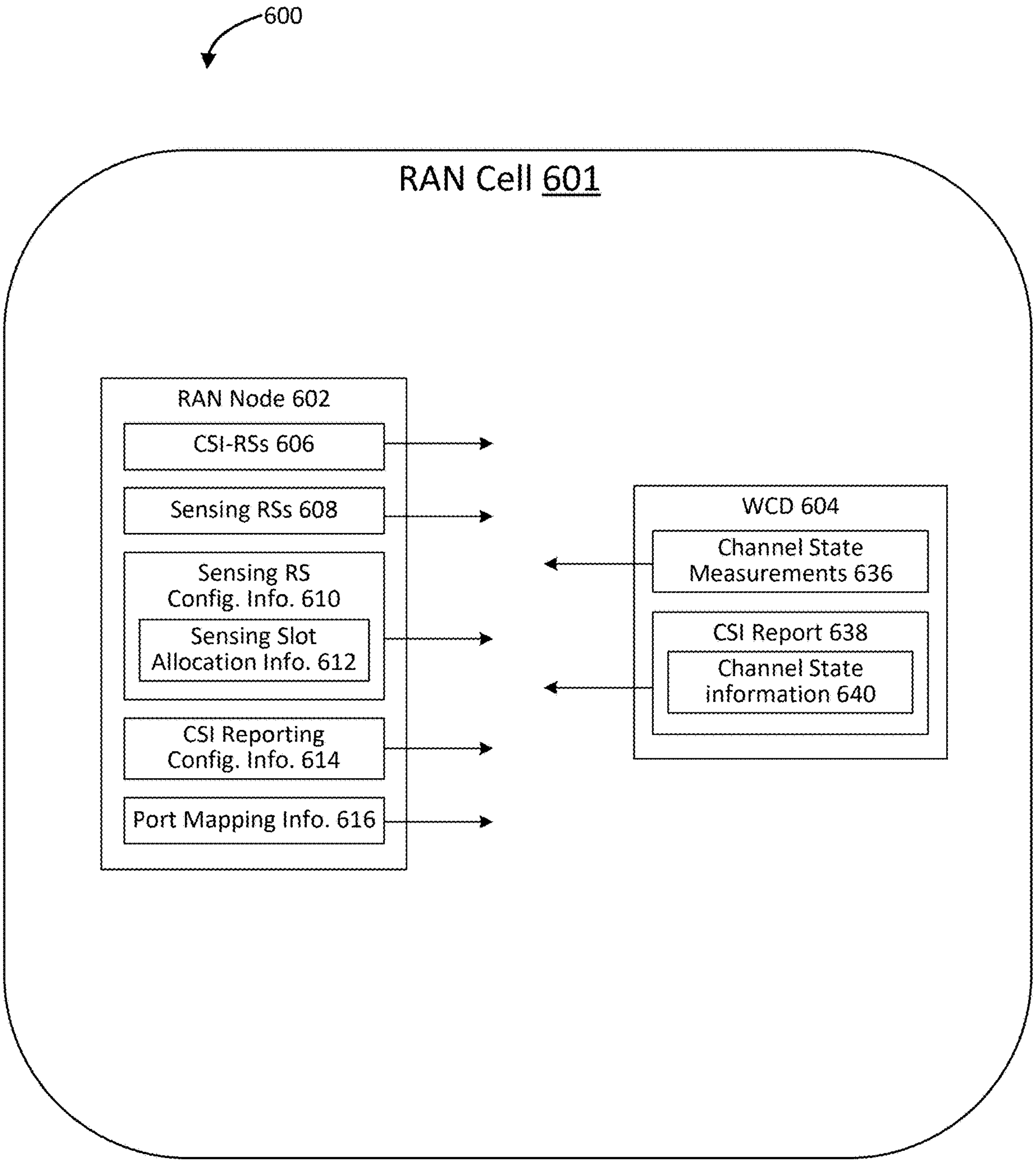
FIG. 6 is a block diagram illustrating an example operating environment, according to aspects of the disclosure.

FIG. 6 is a block diagram illustrating an example operating environment 600, according to aspects of the disclosure. In operating environment 600, a RAN node 602 serves a RAN cell 601, which is a serving cell of a wireless communication device (WCD) 604. In some implementations, wireless communication device 604 can be a UE. In some implementations, RAN node 602 can be a node of an NG-RAN, such as NG-RAN 235 of FIG. 2. In some implementations, RAN node 602 can be a gNB or an ng-eNB.

RAN node 602 can transmit channel state information reference signals (CSI-RSs) 606, which mobile devices (such as wireless communication device 604) in RAN cell 601 can measure in conjunction with downlink (DL) channel state evaluation and reporting. RAN node 602 can also transmit sensing reference signals (RSs) 608, which mobile devices in RAN cell 601 can measure in conjunction with bi-static or multi-static radar sensing.

In order to notify mobile devices in RAN cell 601 of parameters defining aspects of sensing reference signal transmission in RAN cell 601, RAN node 602 can transmit sensing reference signal configuration information 610. In some implementations, RAN node 602 can transmit sensing reference signal configuration information 610 in radio resource control (RRC) messages. In some such implementations, the RRC messages can be common configuration messages.

Figure 5:
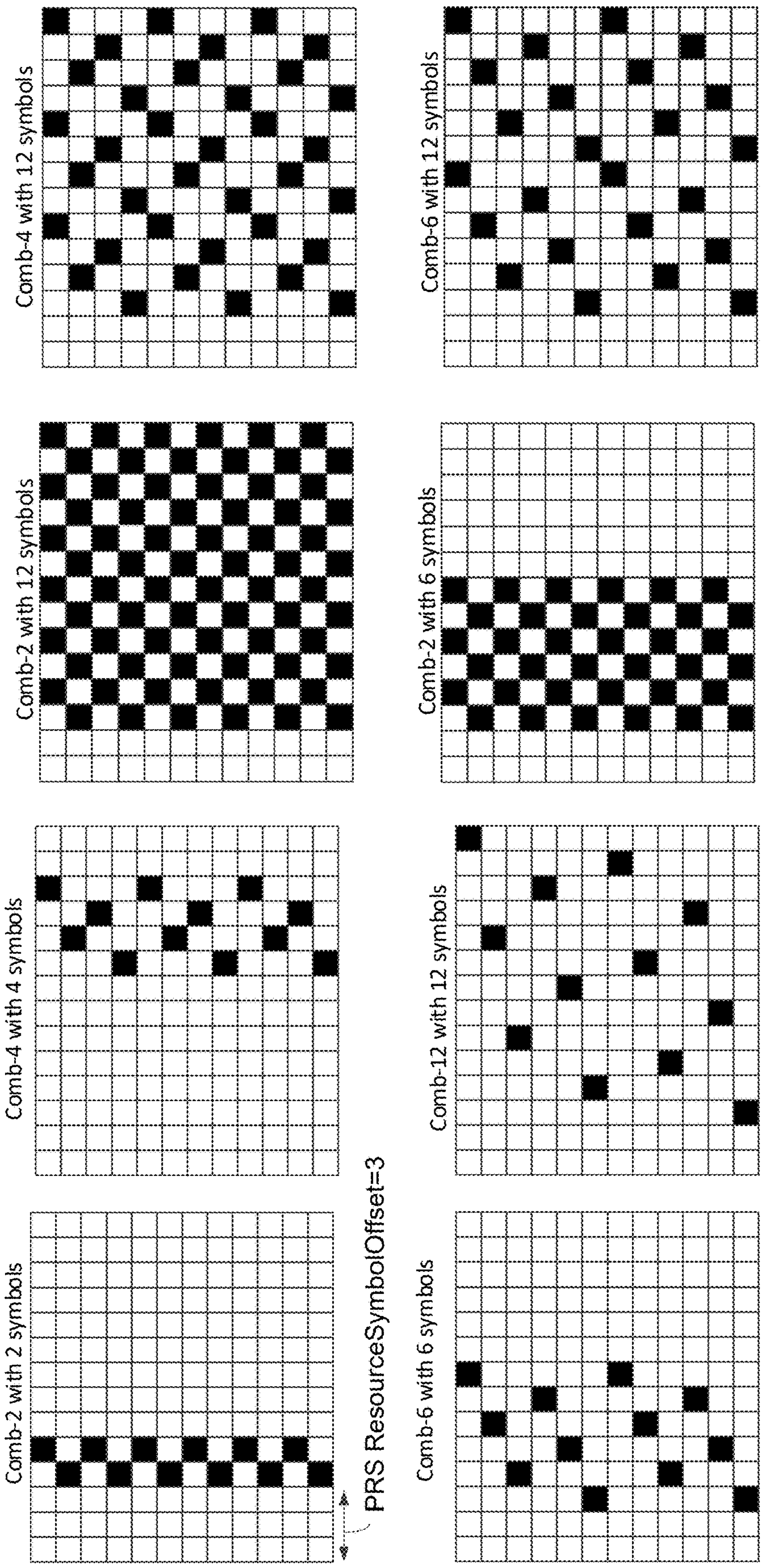
FIG. 5 is a diagram showing example combination (comb) structures, illustrating how RF signals may utilize different sets of resource elements, according to some embodiments.

In some implementations, RAN node 602 can transmit sensing reference signals 608 according to a comb (or "staggering") structure, which may be analogous to the various comb structures for PRSs transmission depicted in FIG. 5. In some such implementations, sensing reference signal configuration information 610 can indicate the comb or staggering structure applied in conjunction with transmission of sensing reference signals 608. In some implementations, sensing reference signal configuration information 610 can indicate a maximum number of antenna ports supported by transmission of sensing reference signals 608.

According to aspects of the disclosure, sensing reference signal configuration information 610 can include sensing slot allocation information 612. Sensing slot allocation information 612 can include information indicating—or usable by mobile devices (such as wireless communication device 604) in RAN cell 601 to determine—slots during which RAN node 602 will transmit sensing reference signals 608. Such slots are referred to herein as "sensing slots."

In various implementations, RAN node 602 can have the ability to selectively enable (or disable) sensing RS-based channel state measurements within RAN cell 601. In an example in which RAN node 602 disables sensing RS-based channel state measurements within RAN cell 601, each mobile device (such as wireless communication device 604) operating in RAN cell 601 may obtain channel state measurements by measuring only CSI-RSs 606. In various implementations, if it has enabled sensing RS-based channel state measurements, RAN node 602 may drop any CSI-RS transmission occasion that is allocated within a sensing slot. In some implementations, RAN node 602 can have the ability to enable (or disable) sensing RS-based channel state measurements on a per-device basis. In an example, RAN node 602 may enable sensing RS-based channel state measurements on the part of wireless communication device 604, but may disable sensing RS-based channel state measurements on the part of another mobile device operating in RAN cell 601. In some implementations, RAN node 602 may drop any CSI-RS transmission occasion that is allocated within a sensing slot as long as it has enabled sensing RS-based channel state measurements on the part of at least one device operating in RAN cell 601.

In some implementations, sensing slot allocation information 612 can indicate whether RAN node 602 transmits sensing reference signals 608 according to a contiguous sensing slot allocation or a non-contiguous sensing slot allocation. According to a contiguous sensing slot allocation, contiguous series of sensing slots can occur at regular intervals defined by a sensing slot period. According to a non-contiguous sensing slot allocation, sensing slots can be clustered at regular intervals defined by the sensing slot period, but can be interspersed among—for example, interleaved with—other slots that are not sensing slots.

Figure 7:
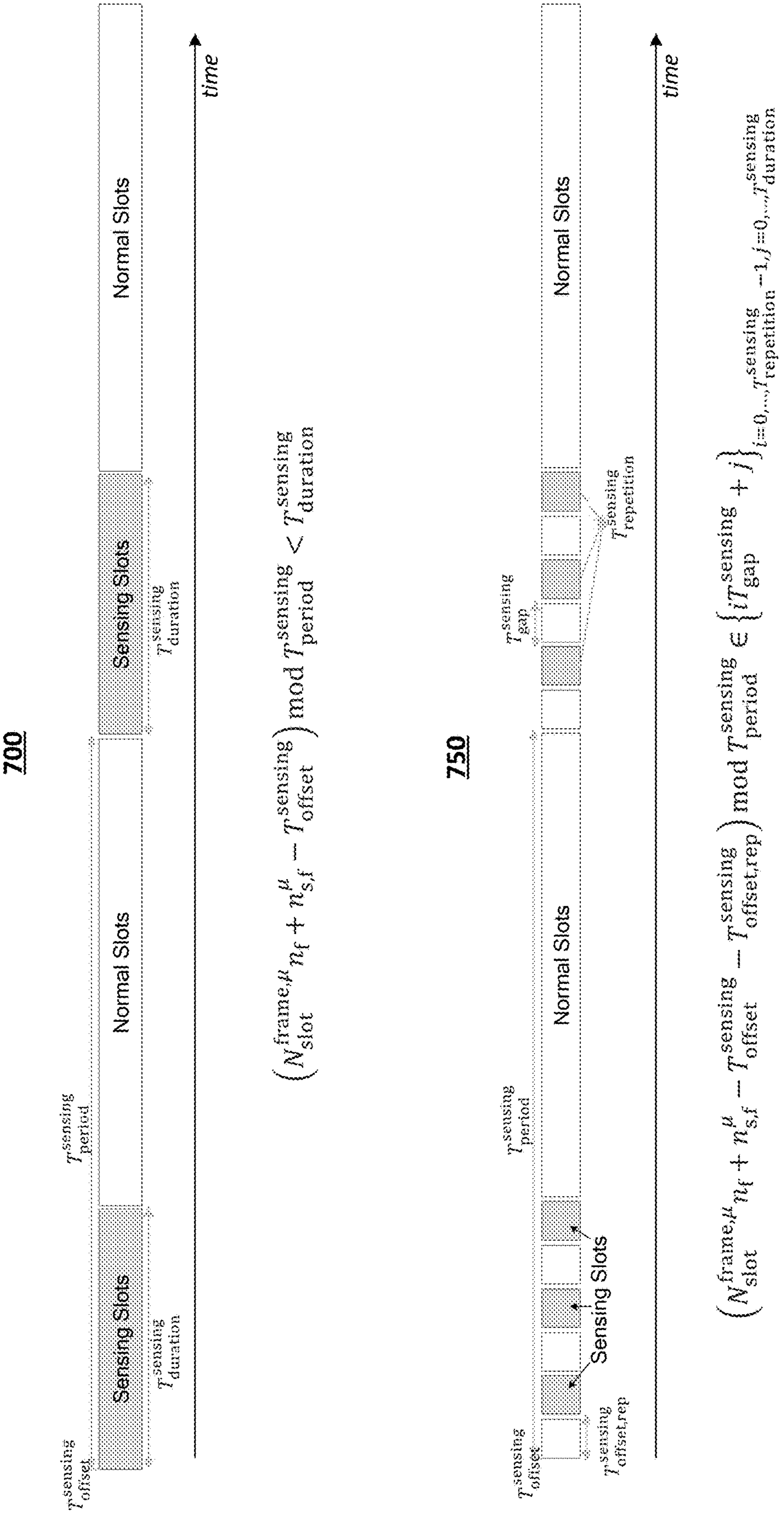
FIG. 7 illustrates an example of a contiguous sensing slot allocation and an example of a non-contiguous sensing slot allocation according to aspects of the disclosure.

FIG. 7 illustrates an example of a contiguous sensing slot allocation 700. According to contiguous sensing slot allocation 700, a sensing slot period $$T_{period}^{sensing}$$

defines the amount of time between the respective beginnings of two consecutive contiguous series of sensing slots, each of which lasts for a duration of $$T_{duration}^{sensing}.$$

A time offset $$T_{offset}^{sensing}$$

defines a starting time of the first contiguous series of sensing slots. According to contiguous sensing slot allocation 700, the slots that are allocated as sensing slots can be those that satisfy Inequality (1) as follows:

$$\left(N_{slot}^{frame,\mu} n_f + n_{s,f}^{\mu} - T_{offset}^{sensing}\right) \bmod T_{period}^{sensing} < T_{duration}^{sending} \quad (1)$$

where $$N_{slot}^{frame,\mu}$$

is the number of slots in a frame, $n_f$ is the system frame number, $$n_{s,f}^{\mu}$$

is the slot number within the radio frame, and μ is the subcarrier spacing index.

FIG. 7 also illustrates an example of a non-contiguous sensing slot allocation 750. According to non-contiguous sensing slot allocation 750, the sensing slot period $$T_{period}^{sensing}$$

defines the amount of time between the respective beginnings of two time intervals during which sensing slots are interspersed among non-sensing slots. The time offset $$T_{offset}^{sensing}$$

defines a starting time of the first such time interval. A parameter $$T_{repetition}^{sensing}$$

defines a number of sensing slot repetitions comprised in each such time interval, and a parameter $$T_{gap}^{sensing}$$

defines an amount of time between consecutive such repetitions. According to contiguous sensing slot allocation 700, the slots that are allocated as sensing slots can be those that satisfy Inequality (2) and Equation (3) as follows:

$$\left(N_{slot}^{frame,\mu} n_f + n_{s,f}^{\mu} - T_{offset}^{sensing} - T_{offset,rep}^{sensing}\right) \bmod T_{period}^{sensing} \in S \quad (2)$$

$$S = \left\{ iT_{gap}^{sensing} + j \right\}_{i=0,\ldots\ T_{repitition}^{sensing}-1;\ j=0,\ldots\ ,T_{duration}^{sensing}} \quad (3)$$

where $$N_{slot}^{frame,\mu}$$

is the number of slots in a frame, $n_f$ is the system frame number, $$n_{s,f}^{\mu}$$

is the slot number within the radio frame, and μ is the subcarrier spacing index.

Returning to FIG. 6, RAN node 602 can transmit CSI reporting configuration information 614 to wireless communication device 604 to control channel state measurement and reporting operations of wireless communication device 604. According to aspects of the disclosure, by sending CSI reporting configuration information 614 to wireless communication device 604, RAN node 602 can provide wireless communication device 604 with a CSI report configuration. The CSI report configuration can define or specify parameters according to which wireless communication device 604 is to generate and transmit one or more CSI reports. According to aspects of the disclosure, the CSI report configuration can specify reference signals that wireless communication device 604 is to measure to obtain channel state measurements based on which it is to determine channel state information for inclusion in one or more CSI reports.

In operating environment 600, wireless communication device 604 can determine channel state information 640 based on channel state measurements 636, and can transmit a CSI report 638 including channel state information 640 to RAN node 602. According to aspects of the disclosure, wireless communication device 604 can identify a set of basis reference signals to be measured to obtain channel state measurements 636 based on a CSI report configuration indicated by CSI reporting configuration information 614. In various embodiments, channel state information 640 can include any or all of a rank indicator (RI), a precoding matrix indicator (PMI), and a channel quality indicator (CQI).

According to some implementations, the CSI report configuration can specify use of only CSI-RSs 606 or only sensing reference signals 608 as basis reference signals for CSI report 640. According to other implementations, the CSI report configuration can permit use of either or both of CSI-RSs 606 and sensing reference signals 608 as basis reference signals CSI report 640. For instance, according to the CSI report configuration in some implementations, wireless communication device 604 can obtain channel state measurements 636 by measuring whichever of CSI-RSs 606 and sensing reference signals 608 has been transmitted most recently. In some implementations, wireless communication device 604 can obtain channel state measurements 636 by measuring whichever of CSI-RSs 606 and sensing reference signals 608 has been transmitted most recently, but no later than a CSI reference resource associated with the CSI report configuration.

According to the CSI report configuration in some implementations, wireless communication device 604 can measure both CSI-RSs 606 and sensing reference signals 608, such that channel state measurements 636 include both measurements of CSI-RSs 606 and measurements of sensing reference signals 608. In various such implementations, wireless communication device 604 can combine the measurements of CSI-RSs 606 and measurements of sensing reference signals 608 to obtain combined channel state measurements, and can determine channel state information 640 based on the combined channel state measurements. According to aspects of the disclosure, RAN node 602 can provide wireless communication device 604 with port mapping information 616 that indicates a mapping between sensing reference signal ports and CSI-RS ports, and wireless communication device 604 can combine measurements of CSI-RSs 606 and measurements of sensing reference signals 608 with reference to that mapping.

In some implementations, RAN node 602 can signal port mapping information 616 to wireless communication device 604 by transmitting downlink control information (DCI) that includes port mapping information 616. In some other implementations, RAN node 602 can signal port mapping information 616 to wireless communication device 604 by transmitting a medium access control (MAC) control element (CE) that includes port mapping information 616. In yet other implementations, RAN node 602 can signal port mapping information 616 to wireless communication device 604 by transmitting an RRC message that includes port mapping information 616.

In various implementations, port mapping information 616 can indicate a precoding matrix that specifies a mapping between sensing reference signal ports and CSI-RS ports. In some implementations, port mapping information 616 can indicate a precoding matrix W that specifies a mapping between sensing reference signal ports and CSI-RS ports according to Equation (4) as follows:

$$\beta_{CSIRS}\begin{bmatrix} a_{CSI}^{(\tilde{p}_0)} \\ a_{CSI}^{(\tilde{p}_1)} \\ \vdots \\ a_{CSI}^{(\tilde{p}_{N-1})} \end{bmatrix} = \beta_{sensing} W \begin{bmatrix} a_{sensing}^{(p_0)} \\ a_{sensing}^{(p_1)} \\ \vdots \\ a_{sensing}^{(p_{M-1})} \end{bmatrix} \quad (4)$$

where M is the number of sensing reference signal ports, N is the number of CSI-RS ports, $$a_{sensing}^{(p_m)}$$

is the sensing reference signal transmitted on the port indexed with $p_m$, $$a_{CSI}^{(\tilde{p}_n)}$$

is the CSI-RS signal transmitted on the port indexed with $\tilde{p}_n$, $\beta_{sensing}$ and $\beta_{CSIRS}$ are power offset values for sensing reference signals and CSI-RSs, respectively, and W is an N×M precoding matrix. According to aspects of the disclosure, W can be an N×M precoding matrix among those in a defined codebook, such as an N-port, rank-M DL codebook.

In various implementations, port mapping information 616 can indicate a precoding vector that specifies a mapping between sensing reference signal ports and CSI-RS ports. In some implementations, if the number of CSI-RS ports N is equal to the number of sensing reference signal ports M multiplied by a positive integer K, port mapping information 616 can indicate a precoding vector $w_m$ that specifies a mapping between sensing reference signal ports and CSI-RS ports according to Equation (5) as follows:

$$\beta_{CSIRS}\begin{bmatrix} a_{CSI}^{(\tilde{p}_{(m-1)K+0})} \\ a_{CSI}^{(\tilde{p}_{(m-1)K+1})} \\ \vdots \\ a_{CSI}^{(\tilde{p}_{mK-1})} \end{bmatrix} = \beta_{sensing} w_m a_{sensing}^{(p_m)},\ m = 0, \ldots , M-1 \quad (5)$$

where $w_m$ is a K×1 precoding vector. According to aspects of the disclosure, $w_m$ can be a K×1 precoding vector among those in a defined rank-1 codebook, such as a K-port, rank-1 DL codebook. In some implementations, the N CSI-RS ports can be divided into M CSI-RS port groups, and a separate $w_m$ can be signaled for each of the M CSI-RS port groups. In some other implementations, a common $w_m$ can be signaled for all of the M CSI-RS port groups.

Figure 8:
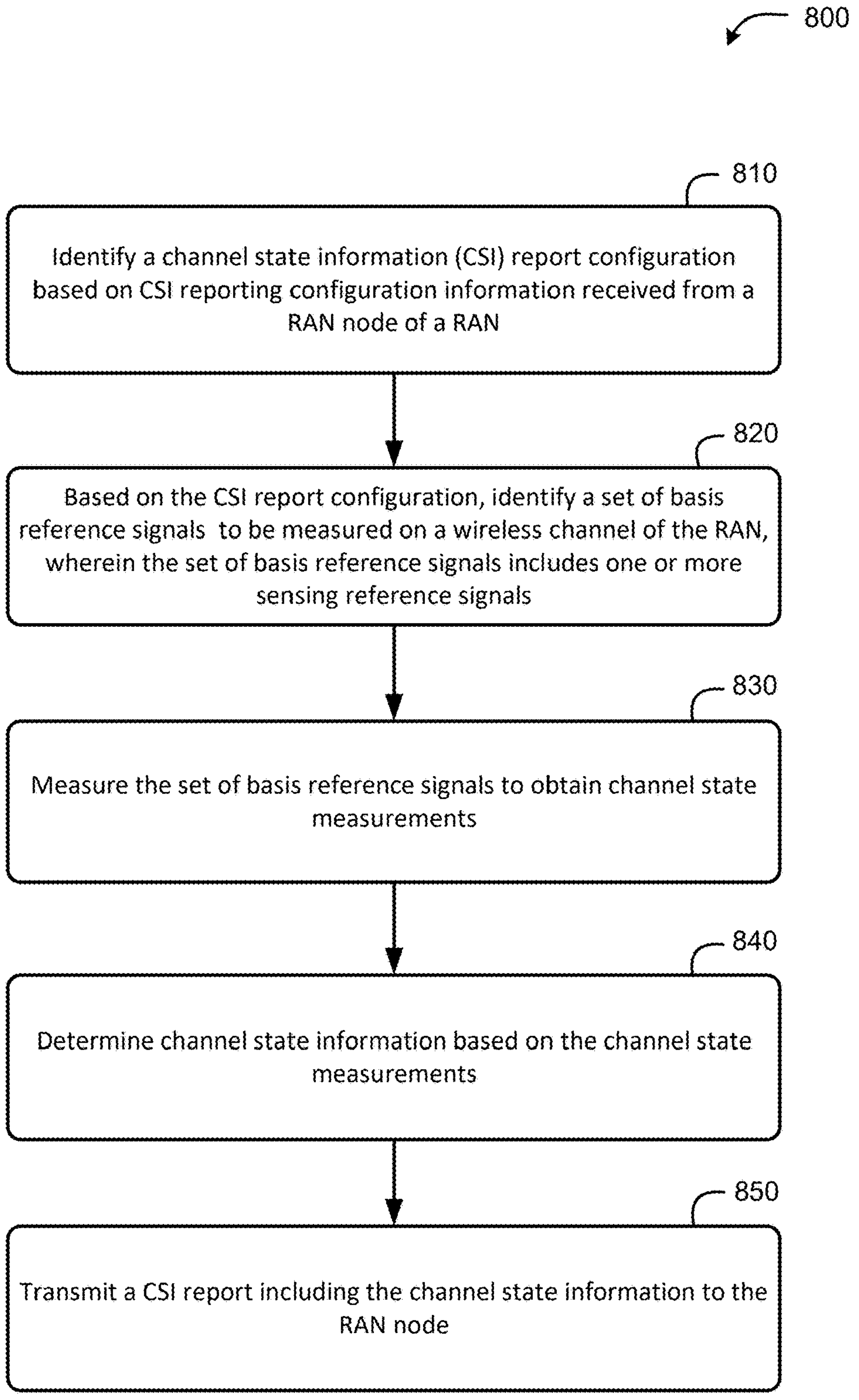
FIG. 8 illustrates an example channel state information (CSI) reporting method according to aspects of the disclosure.
Figure 9:
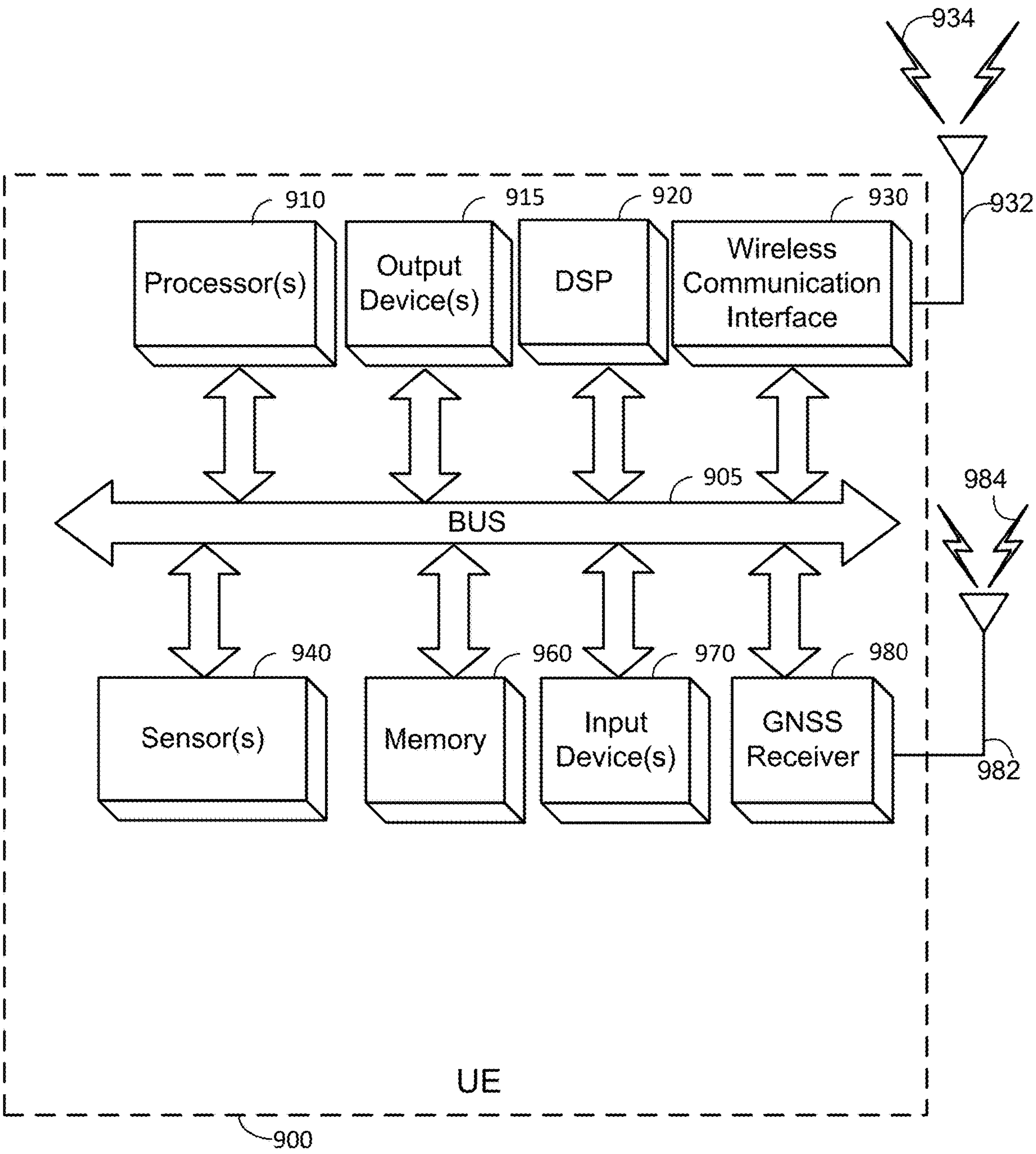
FIG. 9 is a block diagram of an embodiment of a UE, which can be utilized in embodiments as described herein.

FIG. 8 illustrates an example CSI reporting method 800 according to aspects of the disclosure. According to aspects of the disclosure, means for performing the functionality illustrated in one or more of the blocks shown in FIG. 8 may be performed by hardware and/or software components of a mobile device, such as a UE. Example components of a UE are illustrated in FIG. 9, which is described in more detail below. In some examples, wireless communication device 604 may perform the functionality illustrated in one or more of the blocks shown in FIG. 7 in operating environment 600 of FIG. 6.

At block 810, the functionality comprises identifying a channel state information (CSI) report configuration based on CSI reporting configuration information received from a RAN node of a RAN. For example, in operating environment 600 of FIG. 6, wireless communication device 604 can identify a CSI report configuration based on CSI reporting configuration information 614 received from RAN node 602. Means for performing functionality at block 810 may comprise a bus 905, processors 910, digital signal processor (DSP) 920, wireless communication interface 930, memory 960, and/or other components of a UE, as illustrated in FIG. 9.

At block 820, the functionality comprises identifying, based on the CSI report configuration, a set of basis reference signals to be measured on a wireless channel of the RAN, wherein the set of basis reference signals includes one or more sensing reference signals. For example, based on a CSI report configuration identified based on CSI reporting configuration information 614 in operating environment 600 of FIG. 6, wireless communication device 604 can identify a set of basis reference signals to be measured on a wireless channel of a RAN comprising RAN node 602, and the set of basis reference signals can include one or more sensing reference signals 608. Means for performing functionality at block 820 may comprise a bus 905, processors 910, digital signal processor (DSP) 920, wireless communication interface 930, memory 960, and/or other components of a UE, as illustrated in FIG. 9.

In some implementations, each basis reference signal in the set of basis reference signals can be a sensing reference signal. In some other implementations, the set of basis reference signals can also include one or more CSI-RSs. In some implementations, a reference signal scope can be determined based on the CSI report configuration, and the set of basis reference signals can be identified based on the reference signal scope. In some implementations, the reference signal scope can exclude CSI-RSs from the set of basis reference signals, such that the set of basis reference signals can consist only of sensing reference signals. In some other implementations, the reference signal scope can permit inclusion of CSI-RSs among the set of basis reference signals. In some such implementations, a determination that the set of basis reference signals includes one or more sensing reference signals but not any CSI-RSs can be made based on a determination that the one or more sensing reference signals are more recent than any CSI-RSs.

In some implementations, the one or more sensing reference signals can be identified based on sensing slot allocation information received from the RAN node. In some implementations, the sensing slot allocation information can indicate whether the RAN node transmits sensing reference signals according to a contiguous sensing slot allocation or a non-contiguous sensing slot allocation. In some implementations, the sensing slot allocation information can be comprised in a radio resource control (RRC) message received from the RAN node. In some such implementations, the RRC message can include information indicating a sensing reference signal comb structure.

At block 830, the functionality comprises measuring the set of basis reference signals to obtain channel state measurements. For example, in operating environment 600 of FIG. 6, wireless communication device 604 can measure a set of basis reference signals identified at block 820 to obtain channel state measurements 636. Means for performing functionality at block 830 may comprise a bus 905, processors 910, digital signal processor (DSP) 920, wireless communication interface 930, memory 960, and/or other components of a UE, as illustrated in FIG. 9.

In some implementations, measurements of sensing reference signals among the set of basis reference signals can be combined with measurements of CSI-RSs among the set of basis reference signals to obtain combined channel state measurements. In some implementations, the measurements of the sensing reference signals can be combined with the measurements of the CSI-RSs based on a precoding matrix or precoding vector. In various implementations, the precoding matrix or precoding vector can be determined based on downlink control information (DCI), a medium access control (MAC) control element (CE), or a radio resource control (RRC) message received from the RAN node.

At block 840, the functionality comprises determining channel state information based on the channel state measurements. For example, in operating environment 600 of FIG. 6, wireless communication device 604 can determine channel state information 640 based on channel state measurements 636. Means for performing functionality at block 840 may comprise a bus 905, processors 910, digital signal processor (DSP) 920, wireless communication interface 930, memory 960, and/or other components of a UE, as illustrated in FIG. 9.

In some implementations, the channel state information can be determined based on combined channel state measurements obtained by combining measurements of sensing reference signals among the set of basis reference signals with measurements of CSI-RSs among the set of basis reference signals.

At block 850, the functionality comprises transmitting a CSI report including the channel state information to the RAN node. For example, in operating environment 600 of FIG. 6, wireless communication device 604 can transmit a CSI report 638 including channel state information 640 to RAN node 602. Means for performing functionality at block 850 may comprise a bus 905, processors 910, digital signal processor (DSP) 920, wireless communication interface 930, memory 960, and/or other components of a UE, as illustrated in FIG. 9.

FIG. 9 is a block diagram of an embodiment of a UE 900, which can be utilized as described herein above (e.g., in association with FIGS. 1, 2, 6, and 8). For example, the UE 900 can be used to implement one or both of UE 105 of FIGS. 1 and 2 and wireless communication device 604 of FIG. 6. In some examples, UE 900 can perform one or more operations associated with CSI reporting method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 9.

The UE 900 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The UE 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The UE 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 900 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 900 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 910 or DSP 920.

The UE 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 900 (and/or processor(s) 910 or DSP 920 within UE 900). In some embodiments, then, such code and/or instructions can be used to configure and/or adapt a general-purpose computer (or other device) to perform one or more operations in accordance with the described methods.

Figure 10:
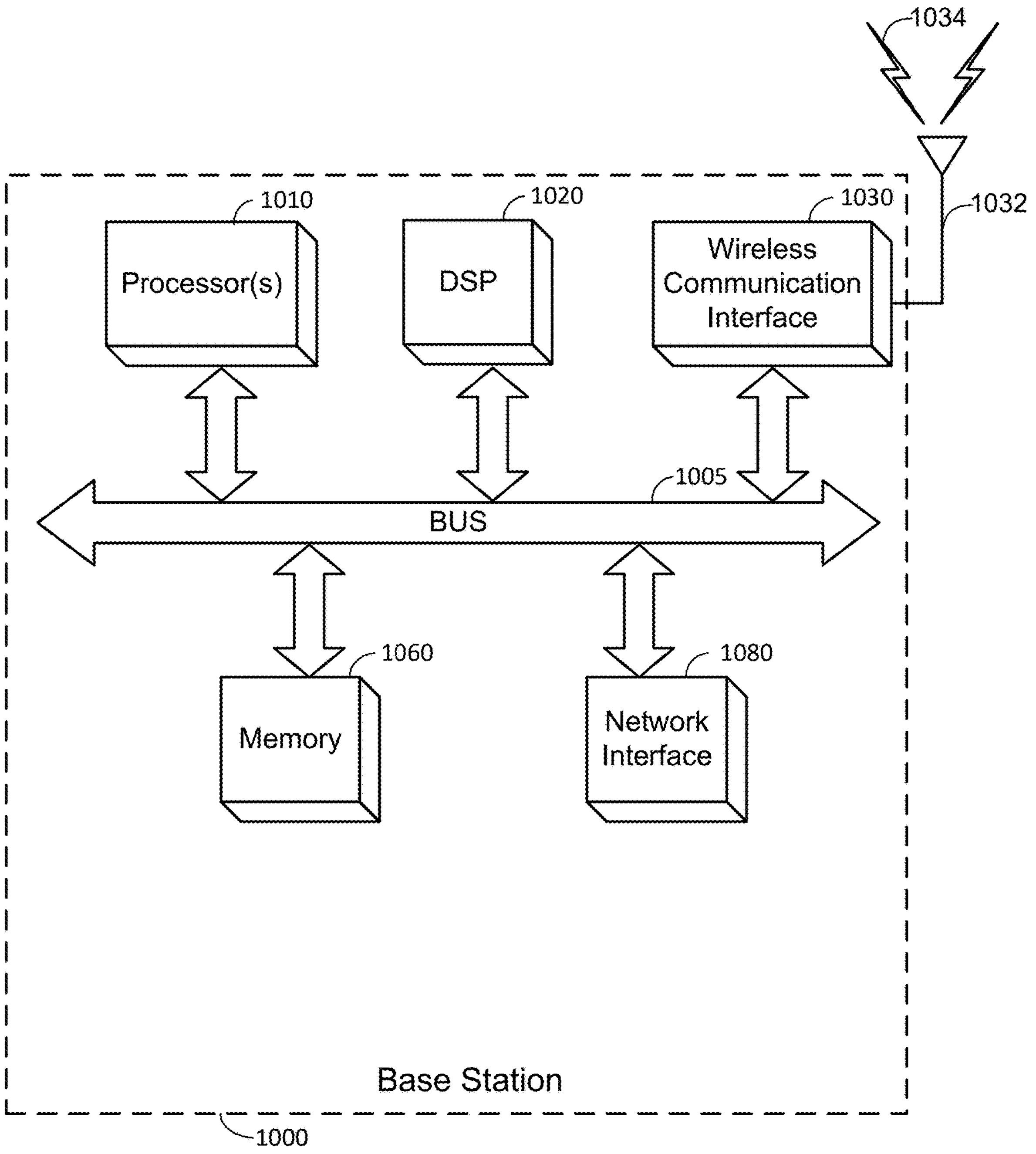
FIG. 10 is a block diagram of an embodiment of a base station, which can be utilized in embodiments as described herein.

FIG. 10 is a block diagram of an embodiment of a base station 1000, which can be utilized as described herein above (e.g., in association with FIGS. 1-2, 6, and 8). For example, the base station 1000 can be used to implement one or both of a base station 120 of FIGS. 1 and 2 and RAN node 602 of FIG. 6. It should be noted that FIG. 10 is meant only to provide a generalized illustration of various components, any or all of which may be utilized as appropriate. In some embodiments, the base station 1000 may correspond to a gNB, an ng-eNB, and/or (more generally) a TRP.

The base station 1000 is shown comprising hardware elements that can be electrically coupled via a bus 1005 (or may otherwise be in communication, as appropriate). The hardware elements may include a processor(s) 1010 which can include without limitation one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below), according to some embodiments. The base station 1000 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1000 to communicate as described herein. The wireless communication interface 1030 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 1000 may further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 1000 also may comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 1000 (and/or processor(s) 1010 or DSP 1020 within base station 1000). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for wireless communication by a wireless communication device in a radio access network (RAN), the method including identifying a channel state information (CSI) report configuration based on CSI reporting configuration information received from a RAN node of the RAN, based on the CSI report configuration, identifying a set of basis reference signals to be measured on a wireless channel of the RAN, where the set of basis reference signals includes one or more sensing reference signals, measuring the set of basis reference signals to obtain channel state measurements, determining channel state information based on the channel state measurements, and transmitting a CSI report including the channel state information to the RAN node.

Clause 2. The method of clause 1, where the set of basis reference signals further includes one or more channel state information reference signals (CSI-RSs).

Clause 3. The method of clause 2, further including combining measurements of sensing reference signals among the set of basis reference signals with measurements of CSI-RSs among the set of basis reference signals, resulting in combined channel state measurements, and determining the channel state information based on the combined channel state measurements.

Clause 4. The method of clause 3, further including combining the measurements of the sensing reference signals with the measurements of the CSI-RSs based on a precoding matrix.

Clause 5. The method of clause 3, further including combining the measurements of the sensing reference signals with the measurements of the CSI-RSs based on a precoding vector.

Clause 6. The method of any of clauses 4 to 5, further including determining the precoding matrix or precoding vector based on downlink control information (DCI) received from the RAN node.

Clause 7. The method of any of clauses 4 to 5, further including determining the precoding matrix or precoding vector based on a medium access control (MAC) control element (CE) received from the RAN node.

Clause 8. The method of any of clauses 4 to 5, further including determining the precoding matrix or precoding vector based on a radio resource control (RRC) message received from the RAN node.

Clause 9. The method of any of clauses 1 to 8, where each basis reference signal in the set of basis reference signals is a sensing reference signal.

Clause 10. The method of any of clauses 1 to 9, further including determining a reference signal scope for the CSI report based on the CSI report configuration, and identifying the set of basis reference signals based on the reference signal scope.

Clause 11. The method of clause 10, where the reference signal scope excludes channel state information reference signals (CSI-RSs) from the set of basis reference signals.

Clause 12. The method of clause 10, where according to the reference signal scope, channel state information reference signals (CSI-RSs) can be included among the set of basis reference signals.

Clause 13. The method of clause 12, further including determining that the set of basis reference signals includes the one or more sensing reference signals and does not include one or more CSI-RSs based on a determination that the one or more sensing reference signals are more recent than the one or more CSI-RSs.

Clause 14. The method of any of clauses 1 to 13, further including identifying the one or more sensing reference signals based on sensing slot allocation information received from the RAN node.

Clause 15. The method of clause 14, where the sensing slot allocation information indicates whether the RAN node transmits sensing reference signals according to a contiguous sensing slot allocation.

Clause 16. The method of clause 14, where the sensing slot allocation information indicates whether the RAN node transmits sensing reference signals according to a non-contiguous sensing slot allocation.

Clause 17. The method of any of clauses 14 to 16, where the sensing slot allocation information is included in a radio resource control (RRC) message received from the RAN node.

Clause 18. The method of clause 17, where the RRC message includes information indicating a sensing reference signal comb structure.

Clause 19. A wireless communication device, including a transceiver, a memory, and one or more processors communicatively coupled with the transceiver and the memory, where the one or more processors are configured to identify a channel state information (CSI) report configuration based on CSI reporting configuration information received from a RAN node of a RAN, based on the CSI report configuration, identify a set of basis reference signals to be measured on a wireless channel of the RAN, where the set of basis reference signals includes one or more sensing reference signals, measure the set of basis reference signals to obtain channel state measurements, determine channel state information based on the channel state measurements, and transmit a CSI report including the channel state information to the RAN node.

Clause 20. The wireless communication device of clause 19, where the set of basis reference signals further includes one or more channel state information reference signals (CSI-RSs).

Clause 21. The wireless communication device of clause 20, where the one or more processors are configured to combine measurements of sensing reference signals among the set of basis reference signals with measurements of CSI-RSs among the set of basis reference signals, resulting in combined channel state measurements, and determine the channel state information based on the combined channel state measurements.

Clause 22. The wireless communication device of clause 21, where the one or more processors are configured to combine the measurements of the sensing reference signals with the measurements of the CSI-RSs based on a precoding matrix.

Clause 23. The wireless communication device of clause 21, where the one or more processors are configured to combine the measurements of the sensing reference signals with the measurements of the CSI-RSs based on a precoding vector.

Clause 24. The wireless communication device of any of clauses 22 to 23, where the one or more processors are configured to determine the precoding matrix or precoding vector based on downlink control information (DCI) received from the RAN node.

Clause 25. The wireless communication device of any of clauses 22 to 23, where the one or more processors are configured to determine the precoding matrix or precoding vector based on a medium access control (MAC) control element (CE) received from the RAN node.

Clause 26. The wireless communication device of any of clauses 22 to 23, where the one or more processors are configured to determine the precoding matrix or precoding vector based on a radio resource control (RRC) message received from the RAN node.

Clause 27. The wireless communication device of any of clauses 19 to 26, where each basis reference signal in the set of basis reference signals is a sensing reference signal.

Clause 28. The wireless communication device of any of clauses 19 to 26, where the one or more processors are configured to determine a reference signal scope for the CSI report based on the CSI report configuration, and identify the set of basis reference signals based on the reference signal scope.

Clause 29. The wireless communication device of clause 28, where the reference signal scope excludes channel state information reference signals (CSI-RSs) from the set of basis reference signals.

Clause 30. The wireless communication device of clause 28, where according to the reference signal scope, channel state information reference signals (CSI-RSs) can be included among the set of basis reference signals.

Clause 31. The wireless communication device of clause 30, where the one or more processors are configured to determine that the set of basis reference signals includes the one or more sensing reference signals and does not include one or more CSI-RSs based on a determination that the one or more sensing reference signals are more recent than the one or more CSI-RSs.

Clause 32. The wireless communication device of any of clauses 19 to 31, where the one or more processors are configured to identify the one or more sensing reference signals based on sensing slot allocation information received from the RAN node.

Clause 33. The wireless communication device of clause 32, where the sensing slot allocation information indicates whether the RAN node transmits sensing reference signals according to a contiguous sensing slot allocation.

Clause 34. The wireless communication device of clause 32, where the sensing slot allocation information indicates whether the RAN node transmits sensing reference signals according to a non-contiguous sensing slot allocation.

Clause 35. The wireless communication device of any of clauses 32 to 34, where the sensing slot allocation information is included in a radio resource control (RRC) message received from the RAN node.

Clause 36. The wireless communication device of clause 35, where the RRC message includes information indicating a sensing reference signal comb structure.

Clause 37. A non-transitory computer-readable medium storing wireless communication instructions for a wireless communication device, the instructions including code for identifying a channel state information (CSI) report configuration based on CSI reporting configuration information received from a RAN node of a RAN, based on the CSI report configuration, identifying a set of basis reference signals to be measured on a wireless channel of the RAN, where the set of basis reference signals includes one or more sensing reference signals, measuring the set of basis reference signals to obtain channel state measurements, determining channel state information based on the channel state measurements, and transmitting a CSI report including the channel state information to the RAN node.

Clause 38. The non-transitory computer-readable medium of clause 37, where the set of basis reference signals further includes one or more channel state information reference signals (CSI-RSs).

Clause 39. The non-transitory computer-readable medium of clause 38, the instructions further including code for combining measurements of sensing reference signals among the set of basis reference signals with measurements of CSI-RSs among the set of basis reference signals, resulting in combined channel state measurements, and determining the channel state information based on the combined channel state measurements.

Clause 40. The non-transitory computer-readable medium of clause 39, the instructions further including code for combining the measurements of the sensing reference signals with the measurements of the CSI-RSs based on a precoding matrix.

Clause 41. The non-transitory computer-readable medium of clause 39, the instructions further including code for combining the measurements of the sensing reference signals with the measurements of the CSI-RSs based on a precoding vector.

Clause 42. The non-transitory computer-readable medium of any of clauses 40 to 41, the instructions further including code for determining the precoding matrix or precoding vector based on downlink control information (DCI) received from the RAN node.

Clause 43. The non-transitory computer-readable medium of any of clauses 40 to 41, the instructions further including code for determining the precoding matrix or precoding vector based on a medium access control (MAC) control element (CE) received from the RAN node.

Clause 44. The non-transitory computer-readable medium of any of clauses 40 to 41, the instructions further including code for determining the precoding matrix or precoding vector based on a radio resource control (RRC) message received from the RAN node.

Clause 45. The non-transitory computer-readable medium of any of clauses 37 to 44, where each basis reference signal in the set of basis reference signals is a sensing reference signal.

Clause 46. The non-transitory computer-readable medium of any of clauses 37 to 45, the instructions further including code for determining a reference signal scope for the CSI report based on the CSI report configuration, and identifying the set of basis reference signals based on the reference signal scope.

Clause 47. The non-transitory computer-readable medium of clause 46, where the reference signal scope excludes channel state information reference signals (CSI-RSs) from the set of basis reference signals.

Clause 48. The non-transitory computer-readable medium of clause 46, where according to the reference signal scope, channel state information reference signals (CSI-RSs) can be included among the set of basis reference signals.

Clause 49. The non-transitory computer-readable medium of clause 48, the instructions further including code for determining that the set of basis reference signals includes the one or more sensing reference signals and does not include one or more CSI-RSs based on a determination that the one or more sensing reference signals are more recent than the one or more CSI-RSs.

Clause 50. The non-transitory computer-readable medium of any of clauses 37 to 49, the instructions further including code for identifying the one or more sensing reference signals based on sensing slot allocation information received from the RAN node.

Clause 51. The non-transitory computer-readable medium of clause 50, where the sensing slot allocation information indicates whether the RAN node transmits sensing reference signals according to a contiguous sensing slot allocation.

Clause 52. The non-transitory computer-readable medium of clause 50, where the sensing slot allocation information indicates whether the RAN node transmits sensing reference signals according to a non-contiguous sensing slot allocation.

Clause 53. The non-transitory computer-readable medium of any of clauses 50 to 52, where the sensing slot allocation information is included in a radio resource control (RRC) message received from the RAN node.

Clause 54. The non-transitory computer-readable medium of clause 53, where the RRC message includes information indicating a sensing reference signal comb structure.

Clause 55. A wireless communication apparatus, including means for identifying a channel state information (CSI) report configuration based on CSI reporting configuration information received from a RAN node of a RAN, means for identifying a set of basis reference signals to be measured on a wireless channel of the RAN based on the CSI report configuration, where the set of basis reference signals includes one or more sensing reference signals, means for measuring the set of basis reference signals to obtain channel state measurements, means for determining channel state information based on the channel state measurements, and means for transmitting a CSI report including the channel state information to the RAN node.

Clause 56. The wireless communication apparatus of clause 55, where the set of basis reference signals further includes one or more channel state information reference signals (CSI-RSs).

Clause 57. The wireless communication apparatus of clause 56, further including means for combining measurements of sensing reference signals among the set of basis reference signals with measurements of CSI-RSs among the set of basis reference signals, resulting in combined channel state measurements, and means for determining the channel state information based on the combined channel state measurements.

Clause 58. The wireless communication apparatus of clause 57, further including means for combining the measurements of the sensing reference signals with the measurements of the CSI-RSs based on a precoding matrix.

Clause 59. The wireless communication apparatus of clause 57, further including means for combining the measurements of the sensing reference signals with the measurements of the CSI-RSs based on a precoding vector.

Clause 60. The wireless communication apparatus of any of clauses 58 to 59, further including means for determining the precoding matrix or precoding vector based on downlink control information (DCI) received from the RAN node.

Clause 61. The wireless communication apparatus of any of clauses 58 to 59, further including means for determining the precoding matrix or precoding vector based on a medium access control (MAC) control element (CE) received from the RAN node.

Clause 62. The wireless communication apparatus of any of clauses 58 to 59, further including means for determining the precoding matrix or precoding vector based on a radio resource control (RRC) message received from the RAN node.

Clause 63. The wireless communication apparatus of any of clauses 55 to 62, where each basis reference signal in the set of basis reference signals is a sensing reference signal.

Clause 64. The wireless communication apparatus of any of clauses 55 to 63, further including means for determining a reference signal scope for the CSI report based on the CSI report configuration, and identifying the set of basis reference signals based on the reference signal scope.

Clause 65. The wireless communication apparatus of clause 64, where the reference signal scope excludes channel state information reference signals (CSI-RSs) from the set of basis reference signals.

Clause 66. The wireless communication apparatus of clause 64, where according to the reference signal scope, channel state information reference signals (CSI-RSs) can be included among the set of basis reference signals.

Clause 67. The wireless communication apparatus of clause 66, further including means for determining that the set of basis reference signals includes the one or more sensing reference signals and does not include one or more CSI-RSs based on a determination that the one or more sensing reference signals are more recent than the one or more CSI-RSs.

Clause 68. The wireless communication apparatus of any of clauses 55 to 67, further including means for identifying the one or more sensing reference signals based on sensing slot allocation information received from the RAN node.

Clause 69. The wireless communication apparatus of clause 68, where the sensing slot allocation information indicates whether the RAN node transmits sensing reference signals according to a contiguous sensing slot allocation.

Clause 70. The wireless communication apparatus of clause 68, where the sensing slot allocation information indicates whether the RAN node transmits sensing reference signals according to a non-contiguous sensing slot allocation.

Clause 71. The wireless communication apparatus of any of clauses 68 to 70, where the sensing slot allocation information is included in a radio resource control (RRC) message received from the RAN node.

Clause 72. The wireless communication apparatus of clause 71, where the RRC message includes information indicating a sensing reference signal comb structure.

What is claimed is:

1. A method for wireless communication by a wireless communication device in a radio access network (RAN), the method comprising:

identifying a channel state information (CSI) report configuration based on CSI reporting configuration information received from a RAN node of the RAN;

based on the CSI report configuration, determining a reference signal scope that identifies a set of basis reference signals to be measured on a wireless channel of the RAN, wherein the reference signal scope indicates measurement of both one or more sensing reference signals and one or more channel state information reference signals (CSI-RSs) based on a respective previous transmission;

receiving port mapping information from the RAN node, wherein the port mapping information indicates a mapping between sensing reference signal ports and CSI-RS ports;

measuring the set of basis reference signals to obtain channel state measurements;

combining measurements of the one or more sensing reference signals with measurements of the one or more CSI-RSs based on the port mapping information to obtain combined channel state measurements;

determining channel state information based on the combined channel state measurements; and transmitting a CSI report including the channel state information to the RAN node.

2. The method of claim 1, wherein determining the reference signal scope comprises determining which was transmitted most recently between the one or more sensing reference signals and the one or more CSI-RSs, and wherein the reference signal scope indicates measurement based on the most recently determination.

3. The method of claim 1, wherein combining the measurements of the one or more sensing reference signals with the measurements of the one or more CSI-RSs comprises:

applying the port mapping information to align the one or more sensing reference signal ports that correspond to the one or more CSI-RS ports; and generating the combined channel state measurements based on the alignment.

4. The method of claim 1, wherein combining the measurements of the one or more sensing reference signals with the measurements of the one or more CSI-RSs based on the port mapping information comprises applying a precoding matrix or precoding vector indicated by the port mapping information.

5. The method of claim 4, further comprising determining the precoding matrix or precoding vector based on downlink control information (DCI) received from the RAN node.

6. The method of claim 4, further comprising determining the precoding matrix or precoding vector based on a medium access control (MAC) control element (CE) or radio resource control (RRC) message received from the RAN node.

7. The method of claim 4, wherein the port mapping information indicates the precoding matrix, the precoding matrix including power offset values for the sensing reference signals and power offset values for the CSI-RSs.

8. The method of claim 4, wherein the precoding matrix comprises an NM precoding matrix from a defined downlink codebook, where N is a number of CSI-RS ports and M is a number of sensing reference signal ports.

9. The method of claim 1, wherein a number of CSI-RS ports is equal to a number of sensing reference signal ports multiplied by a positive integer, and wherein the port mapping information indicates division of the CSI-RS ports into port groups corresponding to the sensing reference signal ports.

10. The method of claim 9, wherein the port mapping information indicates a separate precoding vector for each of the port groups.

11. The method of claim 9, wherein combining the measurements comprises applying separate precoding vectors to the port groups, wherein each port group corresponds to one sensing reference signal port based on the port mapping information.

12. The method of claim 1, further comprising identifying the one or more sensing reference signals based on sensing slot allocation information received from the RAN node.

13. The method of claim 12, wherein the sensing slot allocation information indicates whether the RAN node transmits sensing reference signals according to a contiguous sensing slot allocation or a non-contiguous sensing slot allocation.

14. The method of claim 12, wherein the sensing slot allocation information is comprised in a radio resource control (RRC) message received from the RAN node.

15. The method of claim 14, wherein the RRC message includes information indicating a sensing reference signal comb structure.

16. A wireless communication device, comprising:

a transceiver;

a memory; and one or more processors communicatively coupled with the transceiver and the memory, wherein the one or more processors are configured to:

identify a channel state information (CSI) report configuration based on CSI reporting configuration information received from a radio access network (RAN) node of a RAN;

based on the CSI report configuration, determine a reference signal scope that identifies a set of basis reference signals to be measured on a wireless channel of the RAN, wherein the reference signal scope indicates measurement of both one or more sensing reference signals and one or more channel state information reference signals (CSI-RSs) based on a respective previous transmission;

receive port mapping information from the RAN node, wherein the port mapping information indicates a mapping between sensing reference signal ports and CSI-RS ports;

measure the set of basis reference signals to obtain channel state measurements;

combine measurements of the one or more sensing reference signals with measurements of the one or more CSI-RSs based on the port mapping information to obtain combined channel state measurements;

determine channel state information based on the combined channel state measurements; and transmit a CSI report including the channel state information to the RAN node.

17. The wireless communication device of claim 16, wherein determining the reference signal scope comprises determining which was transmitted most recently between the one or more sensing reference signals and the one or more CSI-RSs, and wherein the reference signal scope indicates measurement based on the most recently determination.

18. The wireless communication device of claim 16, wherein, to combine the measurements of the one or more sensing reference signals with the measurements of the one or more CSI-RSs, the one or more processors are further configured to:

apply the port mapping information to align the one or more sensing reference signal ports that correspond to the one or more CSI-RS ports; and generate the combined channel state measurements based on the alignment.

19. The wireless communication device of claim 16, wherein to combine the measurements of the one or more sensing reference signals with the measurements of the one or more CSI-RSs based on the port mapping information, the one or more processors are further configured to apply a precoding matrix indicated by the port mapping information.

20. The wireless communication device of claim 18, wherein to combine the measurements of the one or more sensing reference signals with the measurements of the one or more CSI-RSs based on the port mapping information, the one or more processors are further configured to apply a precoding vector indicated by the port mapping information.

21. The wireless communication device of claim 19, wherein the port mapping information indicates the precoding matrix, the precoding matrix including power offset values for the sensing reference signals and power offset values for the CSI-RSs.

22. The wireless communication device of claim 19, wherein the precoding matrix comprises an N×M precoding matrix from a defined downlink codebook, where N is a number of CSI-RS ports and M is a number of sensing reference signal ports.

23. The wireless communication device of claim 16, wherein a number of CSI-RS ports is equal to a number of sensing reference signal ports multiplied by a positive integer, and wherein the port mapping information indicates division of the CSI-RS ports into port groups corresponding to the sensing reference signal ports.

24. The wireless communication device of claim 23, wherein the port mapping information indicates a separate precoding vector for each of the port groups.

25. The wireless communication device of claim 23, wherein, to combine the measurements, the one or more processors are further configured to apply separate precoding vectors to the port groups, wherein each port group corresponds to one sensing reference signal port based on the port mapping information.

26. The wireless communication device of claim 16, wherein the one or more processors are further configured to identify the one or more sensing reference signals based on sensing slot allocation information received from the RAN node.

27. The wireless communication device of claim 26, wherein the sensing slot allocation information indicates whether the RAN node transmits sensing reference signals according to a contiguous sensing slot allocation or a non-contiguous sensing slot allocation.

28. The wireless communication device of claim 26, wherein the sensing slot allocation information is comprised in a radio resource control (RRC) message received from the RAN node, wherein the RRC message includes information indicating a sensing reference signal comb structure.

29. A non-transitory computer-readable medium storing wireless communication instructions for a wireless communication device, the instructions comprising code for:

identifying a channel state information (CSI) report configuration based on CSI reporting configuration information received from a radio access network (RAN) node of a RAN;

based on the CSI report configuration, determining a reference signal scope that identifies a set of basis reference signals to be measured on a wireless channel of the RAN, wherein the reference signal scope indicates measurement of both one or more sensing reference signals and one or more channel state information reference signals (CSI-RSs) based on a respective previous transmission;

receiving port mapping information from the RAN node, wherein the port mapping information indicates a mapping between sensing reference signal ports and CSI-RS ports;

measuring the set of basis reference signals to obtain channel state measurements;

combining measurements of the one or more sensing reference signals with measurements of the one or more CSI-RSs based on the port mapping information to obtain combined channel state measurements;

determining channel state information based on the combined channel state measurements; and transmitting a CSI report including the channel state information to the RAN node.

30. A wireless communication apparatus, comprising:

means for identifying a channel state information (CSI) report configuration based on CSI reporting configuration information received from a radio access network (RAN) node of a RAN;

means for determining, based on the CSI report configuration, a reference signal scope that identifies a set of basis reference signals to be measured on a wireless channel of the RAN, wherein the reference signal scope indicates measurement of both one or more sensing reference signals and one or more channel state information reference signals (CSI-RSs) based on a respective previous transmission;

means for receiving port mapping information from the RAN node, wherein the port mapping information indicates a mapping between sensing reference signal ports and CSI-RS ports;

means for measuring the set of basis reference signals to obtain channel state measurements;

means for combining measurements of the one or more sensing reference signals with measurements of the one or more CSI-RSs based on the port mapping information to obtain combined channel state measurements;

means for determining channel state information based on the combined channel state measurements; and means for transmitting a CSI report including the channel state information to the RAN node.

* * * * *